May 31, 1955
L. R. SPAULDING
2,709,784
TRANSMISSION LINE FAULT LOCATOR
Filed Oct. 19, 1949
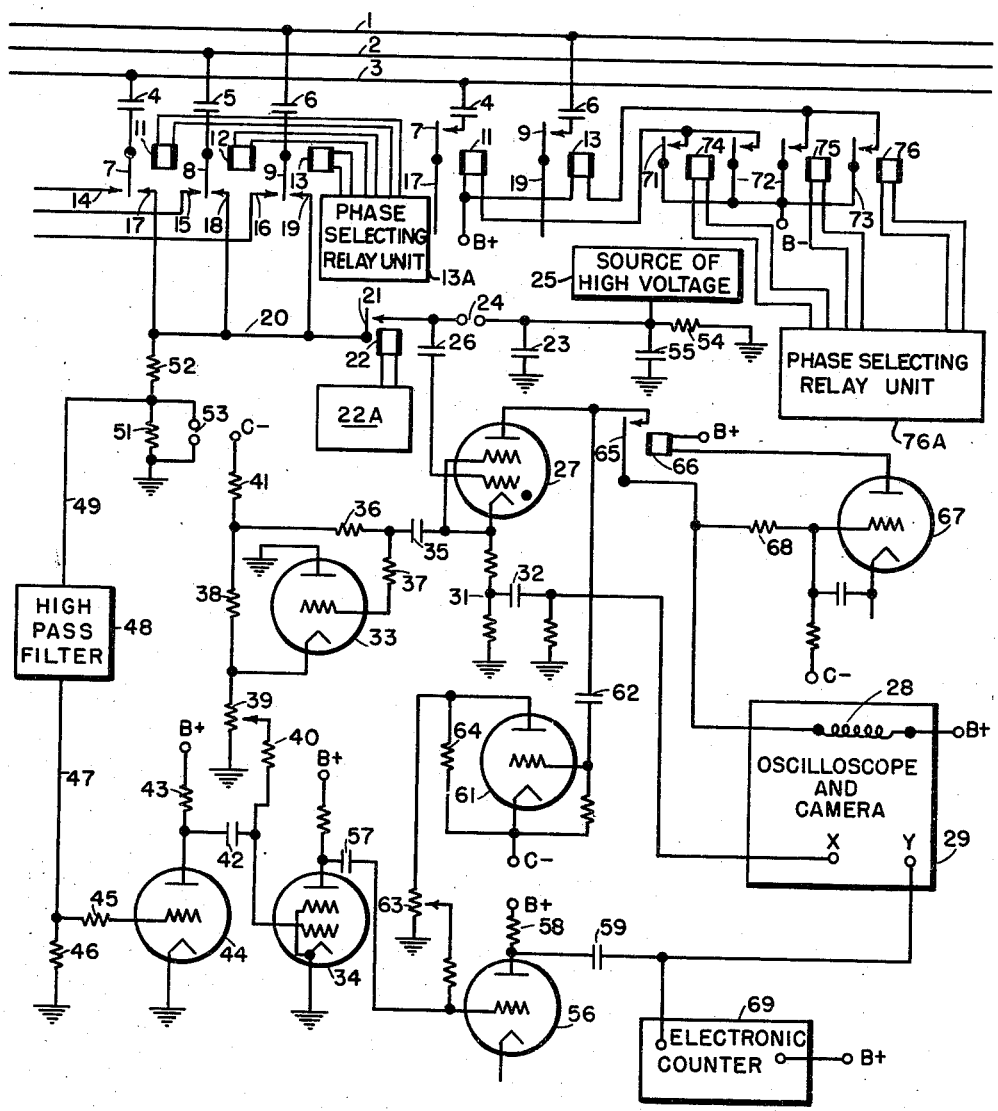
INVENTOR.
LYMAN R. SPAULDING
BY

United States Patent Office 2,709,784
Patented May 31, 1955

2,709,784

TRANSMISSION LINE FAULT LOCATOR

Lyman R. Spaulding, Portland, Oreg.

Application October 19, 1949, Serial No. 122,344

9 Claims. (Cl. 324—52)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883 (22 Stat. 625), as amended by the act of April 30, 1928 (45 Stat. 467, 35 U. S. C., 1946 Ed. Sec. 45).

This invention is concerned with the location of faults on electric power transmission lines and is related to my copending application for patent: "Oscilloscope Photographic System," Serial No. 84,665, now Patent No. 2,633,403, granted March 31, 1953, and application for patent, Stringfield, Stevens, Spaulding and Behrens, "Transmission Line Fault Locater," Serial No. 84,666, now Patent No. 2,628,267 granted February 10, 1953. In particular, this invention is related to the location of line faults by the transmission of electric pulses from one end of the line and the observation of the time required for the reflection of the pulse to return to the point of transmission after being reflected from the line fault.

Transmission line faults are recognized in this art as being characterized by the properties of a resistance connected between the line and ground or between two or more conductors of the line. The ionized path of the fault current can reflect an electrical pulse in much the same way as any other conductor connected between line and ground or between conductors of the line.

It is known in this art that both unidirectional and radio frequency pulses have been used in the location of faults on transmission lines, employing the principles of reflection at the fault. The existing methods using pulses have some inherent disadvantages which are avoided in my present invention. Also in this art it is known that the fault currents themselves produce pulses that travel along the transmission line, and that the time of travel of such pulses after reflection can be used to determine the location of the faults.

In the prior art most nearly related to my present invention, pulses which may be either unidirectional or alternating are continually sent out on the line at a high repetition rate. The pulses are applied to one phase of a three-phase line. A camera is arranged to open its shutter at the proper time to photograph a series of cathode ray oscilloscope traces when a fault occurs on the line.

My improvement departs from the prior art because I have found that applying the pulses to only one phase of a three-phase line when one of the other phases is subjected to a fault does not usually provide a reflected pulse that can be readily distinguished from noise pulses and other spurious pulses, and also because continual pulsing is not necessary for good results. Continuous pulsing is not only unnecessary, but it is impracticable when certain special types of time recording devices such as electronic pulse-time counters are used. It is characteristic of some types of counters to be able to start on the reception of one pulse and to stop at the second pulse. In systems using these devices only two pulses are feasible.

The principal objects of my present invention are: to apply pulses to selected phases of a transmission line during the occurrence of a fault and to observe and time the reflection of the pulse; to select the phase or phases to which pulses are applied depending on the fault conditions; to delay the application of pulses after the starting of the fault to obtain optimum conditions of reflection and observation; and to control the conditions of reception and amplification of the pulses to avoid confusion with spurious indications. Other objects will be apparent from the drawing and the following specification in which my invention is described and set forth.

The drawing is a schematic circuit diagram showing my present invention in a preferred form of embodiment.

In the drawing, 1, 2, and 3 are three conductors of a typical polyphase line. Three conventional coupling condensers 4, 5, and 6 are provided for connection of conductors 1, 2, and 3 to conventional carrier-current appliances as usual and to my fault locater as shown. In an ordinary installation of my invention, the same coupling condensers are used as are provided for the carrier current appliances only for economy. There is no functional necessity of such joint use of coupling condensers.

The joint use of the coupling condensers 4, 5, and 6 is accomplished by three double-throw relays 7, 8, and 9, whose operating coils 11, 12, and 13 are operated by phase selecting relay unit 13A such as Westinghouse H. Q. S. phase selector. Contacts 14, 15, and 16 are connected to the carrier-current equipment and contacts 17, 18, and 19 to the fault locater pulsing bus 20.

In normal unfaulted conditions of operation, relays 7, 8, and 9 are in the position for connecting the condensers 4, 5, and 6 to the carrier-current equipment for communication or for relay operation. This is a novel departure from the prior art in which the fault locater system is continuously connected to the line. My invention by including means for disconnecting equipment normally in use and connecting the fault locater after the fault has started has advantages of economy without any sacrifice of effectiveness.

In the relay arrangement shown, contacts 17, 18, and 19 all connect through a bus 20, referred to as a "pulsing bus" to the contacts of a relay 21 whose coil 22 is controlled by a fault detector relay 22A. Relay 21 and also relays 7, 8, and 9 are controlled by conventional fault detecting relay circuits which, as used in the contemporary art of power line protection, are capable of selecting automatically the phase in fault and making any predetermined selection of contacts 17, 18, 19, and 21 that may be desired.

In the operation of the fault locater, when relay 21 and the appropriate selection of relays 7, 8, and 9 have been closed, a unidirectional pulse of current at an E. M. F. of the order of 10,000 volts is put on the line by a condenser 23 through a spark gap 24. Gap 24 is adjusted so that no spark will pass under the voltage impressed by condenser 23 unless relay 21 is closed. Condenser 23 is charged to the required voltage by a conventional source of direct current 25.

If alternating current pulses are desired instead of unidirectional pulses, they can be provided by substituting alternating pulse apparatus already known in the related arts.

The closing of relays 7, 8, 9 and 21 and the application of the pulse to the line are delayed after the start of the fault to permit the attenuation of transient pulses that might have been produced by the starting of the fault at flashover. The amount of delay is of the order of a hundredth of a second. This delay is readily accomplished by the use of conventional relays.

When gap 24 flashes over, a potential difference is impressed on a small condenser 26 connected to the control grid of a gas-filled tube 27, such as a thyratron. The potential on condenser 26 causes tube 27 to become conducting and to "fire."

The plate current of tube 27 is drawn through a coil 28 in a recording oscilloscope 29. Coil 28 operates a camera which photographs the oscilloscope trace as described in my Patent No. 2,633,403: "Oscilloscope Photographic System." The operation of the camera by coil 28 includes that of mechanically advancing the recording film one frame at a time. This action, being inherently slower than the operation of the oscilloscope beam, occurs after the reflection of the pulse has been received and recorded.

The cathode current of tube 27 produces, in a cathode resistor 31, a voltage a portion of which through a condenser 32, is impressed on the sweep axis, usually the horizontal axis circuit of oscilloscope initiating a single sweep across the cathode-ray tube screen. Oscilloscopes capable of adaptation to this use are commercially available. A similar use of oscilloscope is described in the patent to Stringfield et al., mentioned above.

The voltage produced across resistor 31 by tube 27 is used also to control a triode 33, which is used in turn to control the grid bias voltage on an amplifying tube 34. The voltage of resistor 31 is impressed through a condenser 35 on a circuit comprising a bias resistor 36 and a grid resistor 37. When tube 27 fires, the voltage between condenser 35 and ground increases, and this makes the grid of tube 33 less negative with respect to ground than when tube 27 is not firing. Before tube 27 fires, tube 33 is biased to cutoff by the voltage existing normally across a resistor 38 which is of low resistance compared with that of resistor 36. Resistor 37 is inserted to prevent parasitic oscillation of tube 33.

When tube 27 fires, tube 33 changes from cutoff to full conducting due to the change in bias. When fully conducting, tube 33 appears in the circuit as a resistance of the order of 1000 ohms. In this condition, tube 33 acts practically as a short-circuit to ground at the junction of resistor 38 and a grounded potentiometer 39. A resistor 40 is inserted in the potentiometer tap to provide the usual grid coupling resistance and to establish the desired time constant of the circuit comprising resistor 40 and the associated resistors and condensers. A ballast resistor 41 is introduced in the C lead to prevent excessive current being drawn from the C voltage source when tube 33 is conducting.

When tube 33 appears as a low resistance, bringing the voltage of potentiometer 39 to approximately ground potential, the grid bias of tube 34 becomes less negative. Before tube 27 fires, the grid of tube 34 is held at a predetermined negative bias by suitable adjustment of potentiometer 39. When the upper end of potentiometer 39 is, in effect, grounded by tube 33, the voltage on the grid of tube 34 gradually becomes less negative depending on the time constant of the grid circuit of tube 34. The grid circuit includes potentiometer 39, resistor 40, a grid condenser 42, and a plate circuit resistor 43 associated with a triode amplifier 44.

At the instant when tube 27 fires, tube 34 is subjected to a normal negative bias at which the amplification gain of tube 34 is comparatively low. After tube 27 fires, the bias of tube 34 decreases and the gain increases. The time constant of the grid circuit of tube 34 is such as to permit the gain of tube 34 to increase from the minimum to the maximum value within the time required for the sweep in oscilloscope 29 to traverse the horizontal axis.

The timed variation of gain in tube 34 is used to equalize, to a practical degree, the attenuation in the pulses sent out on the line and reflected back from the fault. The farther away from the end of the line the fault occurs, the longer it takes for the pulse to go to and return from the fault. By increasing the gain in the amplification as a function of time after sending the pulse, the weaker signals are amplified more than the stronger signals that return sooner. Tube 34 is referred to as a time-varied-gain amplifier.

The signal received by the time-varied-gain amplifier 34 is transmitted thereto by amplifier tube 44 referred to as a limiter amplifier. This tube operates as a normal amplifier for weak signals but for very large signals the amplification is decreased by the effect of the signal on the grid. Very large positive signals saturate the grid by causing the grid current to increase. Very large negative signals increase the grid bias and decrease the amplification gain. A series grid resistor 45 is provided to limit the grid current for excessive positive signals. The grid signal is the voltage that appears across a resistor 46 terminating a conventional video transmission line 47.

Line 47 is served by a high-pass filter 48 which receives through line 49 a signal from one or more of condensers 4, 5, and 6. Along with the desired pulse signal, carrier-current relay or communication signals are impressed on the line and are delivered to filter 48 which is designed to pass only signals of high frequency and to block out signals of carrier frequency.

A resistor 51 of the order of 1000 ohms and a resistor 52 of the order of 10 ohms provide the coupling for line 49 to the line coupling condensors. Resistor 51 is paralleled by a spark gap 53 which acts in series with spark gap 24 to produce the pulses for transmission out onto the line. The resistance of resistor 51 is such as to produce a voltage across gap 53 of the order of 10,000 volts. The resistor 52 acting in series with the resistance and capacitance of high voltage source 25, the resistance being represented by a resistor 54 and capacitance by condenser 55, discharges the system in a time of the order of ten microseconds. During the spark discharge, any signal received is shorted to ground either through spark gap 24 or gap 53. It is desirable therefore to extinguish the spark as quickly as possible after the line has received the pulse, so as to receive reflections promptly if there is a fault a short distance out on the line.

Referring again to amplifier 34, the output signal thereof is transmitted to detector tube 56 through the usual grid coupling condenser 57. The output of detector 56, developed across plate resistor 58, is transmitted through plate coupling condenser 59 to the vertical "Y" deflection circuit of oscilloscope 29.

Tube 56 is controlled in part by a "gate" or blocking amplifier tube 61. Gate tube 61 is normally biased to full conductivity when tube 27 is not firing. When tube 27 fires, the plate thereof becomes less positive and this has the effect of impressing a negative impulse of voltage on the grid of tube 61 through a grid coupling condenser 62. The result is to bias, momentarily, tube 61 to cutoff. During the time tube 61 is biased to conduct, the resistance from C– to the grid of tube 56 through a potentiometer 63 is of the order of 10,000 ohms. When tube 61 is biased to cutoff, the plate-cathode resistance thereof increases to a high value so the resistance from C– to tube 56 increases to a resistance approximating that of resistor 64 which is of the order of 200,000 ohms.

With the resistance of tube 61 low, tube 56 is blocked by being biased beyond the voltage necessary for cutoff. When the resistance of tube 61 increases, the bias is shifted to a lower value determined by the adjustment of potentiometer 63 so that tube 56 is unblocked and put in optimum adjustment for detection. By this arrangement, detector 56 cannot transmit a signal to oscilloscope 29 until tube 27 fires. The length of time tube 56 is operating is only that of the duration of firing of tube 27 so that disturbances either before or after the operation are not detected. When tube 61 is cut off, tube 56 is usually not quite conducting but requires a positive pulse signal voltage on its grid to make it conduct. This prevents small voltages from passing but allows higher signal voltages to pass. This "threshold" point is set by potentiometer 63.

After tube 27 has fired, an interruption of plate current is required for restoring the system to a condition for another operation. This is accomplished by a relay 65 which is normally held closed by a coil 66 carrying the plate current of a triode 67. Under normal conditions, the grid of tube 67 is held at a bias potential that permits approximately normal plate current to flow. When tube 27 fires, the voltage on the plate of tube 27 decreases causing the grid bias on tube 67 to become negative. This decreases the plate current through tube 67 permitting relay 65 to open, thus interrupting the plate current of tube 27. This restores the system to the condition for receiving another signal.

Alternative to the use of oscilloscope 29, an electronic time counter 69 can be used. When the time counter 69 is used, it may be a conventional device capable of measuring and recording the time between two pulses. In this arrangement, the counter begins to record time when tube 27 fires and puts detector into condition for receiving signals. The counter stops when tube 56 detects a pulse of a predetermined magnitude.

Referring again to the line connections in the drawing, an alternative arrangement of connection to the phases 1, 2, and 3 is shown to the right of the arrangement already discussed. In the alternative arrangement, only two line coupling condensers 4 and 6 are provided. This is a measure of economy but there are circumstances when a third coupling is not desired. The omission of the third coupling condenser 5 is occasioned when one of the three phases is carrying signals for relaying or for communication which it is desired to protect from the application of the fault locating pulses from source 25. For example, if line 2 is used for carrier relaying, fault locater pulsing might be restricted to phases 1 and 3.

In this arrangement, I have found under these conditions that if, for example, the fault occurs on either phase 1 or line 3, the locater pulse should be applied to the faulted phase. If phase 2 is faulted, the best practicable results are obtained by pulsing both phases 1 and 3 simultaneously. This selection of phases for pulsing is accomplished by the alternative connection shown in the drawing.

Relays 11 and 13 are provided, as before, omitting relay 12. A phase selector relay 71 is provided for phase 1, a similar relay 73 for phase 3, and a third relay 72 for both phases 1 and 3. The coils 74, 75, and 76 respectively of these relays are operated by the fault detector relays ordinarily used in power line protection such as Westinghouse H. Q. S. unit 76A. The coils 74, 75, and 76 of the fault detector relays are connected to the phase selecting relay unit 76A as phase selection is accomplished by conventional methods already known in this art.

The completely elaborated embodiment of my invention as described above is not always required in full for fault location. The possible simplifications can be understood from a summary discussion. In ordinary operation, conventional relays are used to detect the line fault and to indicate the phase or phases on which the fault occurs. These relays cause one or more of relays 7, 8, and 9 to operate and relay 22 to close. Closing relay 22 puts an electric pulse on the line by flashing over spark gaps 24 and 53.

The sparkover in gap 24 causes gas tube 27 to fire, thus putting oscilloscope 29 or electronic counter 69 or both in action. Gas tube 27 also actuates bias control tube 33, and indirectly time-varied-gain tube 34, and gate tube 61. Tube 27 initiates action to reset itself through relay 65 operated by tube 67 whose grid is controlled by tube 27.

The inherent delay in these operations is adjustable to some extent so that the application of the pulse to the line can be timed to permit some of the unwanted disturbances on the line that accompany the fault flashover to be attenuated before timing for the fault location is begun. The inherent delay in mechanical operation of relays is used, with adjustment, to permit the completion of the fault location measurement during the time the mechanical reset operation is being accomplished.

When tube 27 has fired, the horizontal-axis sweep in oscilloscope 29 moves across the screen in the time required for a pulse to travel from the pulse generator to the fault and to return. This is equivalent to twice the length of the line divided by about the speed of light. Deflections in the vertical axis are introduced into the oscilloscope sweep at equal time intervals by methods already known in oscilloscopic art to indicate distance as a function of time of pulse return.

The reflected pulse is received through high-pass filter 48 which is normally provided with a small condenser as part of the filter circuit which emphasizes the sharpness of the wave front of impinging pulses, and thus discriminates against pulses of long duration. The received pulse is amplified through tubes 44 and 34 in succession, detected or rectified in tube 56 and further amplified in oscilloscope 29 where a deflection in the vertical axis is produced. These deflections, as observed in practice, are of very brief duration, appearing as substantially straight vertical deflections in photographs of the oscilloscope screen trace. In order to assure a reflected pulse deflection of sufficient magnitude to be readily distinguishable, the initial pulse transmitted is made as large as conditions will permit.

The time-varied-gain amplifier 34 is used to amplify the received pulse somewhat proportionally to the length of the line. This is needed particularly when electronic counter 69 is used in order to have a sufficiently large detected signal to operate the counter with assured precision and to avoid accidental operation by unwanted signals. The time-varied-gain tube 34 and the bias control tube 33 may be omitted if line conditions permit and only oscilloscopic recording is used.

In the simplest practicable embodiment of this invention, the functions of limiter amplifier 44 and detector 56 may be combined, eliminating not only tubes 33 and 34 but also gate tube 61 and reset tube 67. In the simplest version, the contacts of relay 65 are operated mechanically by the same coil, 28, that operates the camera film advance in photographing the oscilloscope record. In simplifying the arrangement, high-pass filter 48 may be replaced by a small condenser which offers a high impedance to all but steep-fronted signals.

Other modifications appropriate to special local conditions can be made as long as the functions of tubes 27 and the pulsing and oscillographic recording are accomplished. Taking account of variations that would be evident to those skilled in this art within the general framework of my invention, I claim:

1. In transmission line fault location, the method which consists of detecting the occurence of a fault on a line, transmitting a single short pulse on said line, receiving the reflection of said pulse, amplifying and recording said received reflection, and varying the degree to which said reflection is amplified so that the amplification increases depending on the length of time that has passed after said pulse was transmitted.

2. In a device for locating faults on a transmission line, the combination of means for detecting the occurrence of a fault on said line, means responsive to said detecting means for transmitting a brief single electrical pulse on said line from one end thereof at a predetermined length of time after the occurrence of said fault, means for recording the time between the transmission of said pulse and the return of the pulse reflection to the point of transmission, means for receiving said pulse reflection and controlling said recording means, and means responsive to the transmission of said single electrical pulse for inactivating said receiving means after said receiving means has been active for a predetermined length of time after the occurrence of said fault until the occurrence of another fault on said line.

3. In a transmission line fault locater, the combination of means for detecting a fault on a line, means for transmitting a single short pulse on said line at a predetermined interval of time following occurrence of said fault, means for receiving, and amplifying the reflection of said pulse, means responsive to said transmitting means for increasing the gain of said receiving means as a function of time, and means for recording the reception of said reflected pulse on a time base indicating time elapsed following the transmission of said pulse.

4. In a transmission line fault locater, the combination of a pulsing bus, means for capacitively connecting said bus to the phases of a transmission line, a source for producing single electrical pulses, means for receiving, and amplifying the reflection of a pulse on said line, a time-varied-gain circuit associated with said amplifier and arranged to vary the gain of said amplifier as a function of time, and means responsive to the source of pulsing voltage for initiating gain increase in said gain circuit when subjected to a voltage produced concurrently with a pulse on said line.

5. In a transmission line fault locater, the combination of a plurality of condensers for connection to the phases of a transmission line, means for imparting a brief single pulse through said condensers, means for receiving the reflection of said pulse from said line, a gaseous discharge tube actuated by a pulse when transmitted to said line, a receiving amplifier whose gain is controlled by said gaseous tube, a blocking amplifier, a reset relay and recording means also controlled by said gaseous tube, so connected that when a pulse is imparted to said line, said gaseous tube operates, and, through control, increases the gain of said receiving amplifier as a function of time, unblocks said blocking amplifier and actuates said reset relay and recording means.

6. In combination with an electric transmission system, a transmission line and a detector for indicating the existence of electrical faults on said line, a selective relay actuated by said detector whereby a pulsing bus is connected to the faulted part of said line, a pulsing relay actuated by said detector whereby a single high voltage pulse is applied to said line at a predetermined time after the occurrence of a fault, an amplifying and detecting circuit connected to said faulted part of said line simultaneously with said pulse application, time recording means connected to said amplifier and detecting circuit, and means for starting said recording means at the time said pulse is applied and stopping said recording means at the time when the reflection of said pulse is detected.

7. Means as set forth in claim 6, in which means are provided for varying the gain of said amplifying and detecting circuit as a function of time by the time regulated discharge of a condenser grounded through an electronic tube brought to decreased resistance at the time said pulsing relay is operated.

8. Means as set forth in claim 6, together with an electronic discharge tube controlled by said pulsing relay, an oscilloscope and camera with a controlling relay responsive to said discharge tube, and an electronic blocking tube also controlled by said pulsing relay for blocking the action of said amplifying and detecting circuit, whereby said circuit is unblocked and said oscilloscope put in action at the time said pushing relay operates.

9. In combination with an electric transmission system, a condenser and a charging potential therefor, means for discharging said condenser through a spark gap and through said transmission system to impress a single outgoing pulse on said transmission system, receiving and amplifying means connected to said transmission system at least for a predetermined period of time after the discharge of said condenser, gain control means responsive to the discharge of said condenser for increasing the gain of said receiver as a function of time, a recording means connected to said receiver through a blocking means, said blocking means being responsive to the discharge of said condenser and operating to connect said receiving means to said recording means for a predetermined period of time after said condenser discharge.

References Cited in the file of this patent

UNITED STATES PATENTS

| | | |
|---|---|---|
| 2,345,932 | Gould | Apr. 4, 1944 |
| 2,361,437 | Trevor | Oct. 31, 1944 |
| 2,405,071 | Tonks | July 30, 1946 |
| 2,408,824 | Varela | Oct. 8, 1946 |
| 2,472,784 | Barnes | June 14, 1949 |
| 2,477,023 | Weaver | July 26, 1949 |
| 2,499,759 | Kempf | Mar. 7, 1950 |
| 2,602,834 | Leslie et al. | July 8, 1952 |
| 2,651,752 | Devot | Sept. 8, 1953 |

OTHER REFERENCES

Electrical World, Nov. 6, 1948, pages 89, 90 and pages 88, 91.
Electrical World, Aug. 19, 1944, pages 97–99.
Electrical Engineering, November 1948, page 1060.
American Institute of Electrical Engineers Technical Paper 47–48, titled Pulse Echo Measurements on Telephone and Television Facilities by Abraham et al., December 1946 (11 pages, 3 sheets).